(12) United States Patent
Miyake et al.

(10) Patent No.: US 6,459,168 B1
(45) Date of Patent: Oct. 1, 2002

(54) POWER WINDOW MECHANISM FOR ENABLING WINDOW TO BE OPENED IN CASE OF SUBMERGENCE OF VEHICLE

(75) Inventors: Ryoji Miyake; Tatsuaki Oniishi, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 11 days.

(21) Appl. No.: 09/612,908

(22) Filed: Jul. 10, 2000

(30) Foreign Application Priority Data

Jul. 9, 1999 (JP) ............................................ 11-196310

(51) Int. Cl.⁷ ................................................. H02H 5/00
(52) U.S. Cl. ........................ 307/10.1; 307/9.1; 307/125; 318/481
(58) Field of Search ................................ 307/10.1, 125; 73/335.06, 863.52

(56) References Cited

U.S. PATENT DOCUMENTS 6,031,296 A * 2/2000 Takagi et al. ............... 307/10.1

FOREIGN PATENT DOCUMENTS

EP            0 931 899 A1      7/1999    ............ E05F/15/16

* cited by examiner

*Primary Examiner*—Brian Sircus
*Assistant Examiner*—Robert L. Deberadinis
(74) *Attorney, Agent, or Firm*—Sughrue Mion, PLLC

(57) ABSTRACT

A submergence backup circuit includes a submergence detection portion having a submergence detection portion for detecting a submergence state. The submergence backup circuit is configured so that a window is controlled to be opened when a manual window operating switch is operated into an opening side but the window is controlled to be not closed when the manual window operating switch is operated into a closing side.

4 Claims, 2 Drawing Sheets

POWER WINDOW MECHANISM FOR ENABLING WINDOW TO BE OPENED IN CASE OF SUBMERGENCE OF VEHICLE

BACKGROUND OF THE INVENTION

1. Technical Field

The present invention relates to a vehicle submergence measures apparatus for detecting submergence of a vehicle.

2. Related Art

A power window mechanism for opening/closing a pane of window glass by using a motor, or the like, has been generally set up in a vehicle such as a car in recent years. In the case of a vehicle having such a power window mechanism, provision of a various submergence measures to submergence in a sea, a lake, or the like, due to an unforeseen accident, or the like, has been discussed. The submergence measures enable a crew member to escape out of the vehicle easily when the vehicle has been submerged, by opening a pane of window glass automatically, or securely opening the pane of window glass by a manual operation.

Such a submergence measures uses a structure which has a submergence detection means for detecting a submergence state, a control circuit for controlling a movement, and a drive circuit for supplying driving electric power to a motor, or the like, to drive a pane of window glass to open/close the window. The structure enable the pane of window glass to compulsorily open or to securely open by operating an emergency backup circuit when submergence is detected.

In the above submergence measures, any technique for detecting submergence has never been established sufficiently. In the conventional art, a special sensor unit having a light transmitter and a light receiver for detecting water invasion optically was used for detecting submergence. In the case where such a special sensor unit was used, there was a problem that the cost of the submergence measures was increased greatly or a large space was required for arranging the special sensor unit. Hence, the emergency backup circuit using the special sensor unit became large-scaled and expensive.

SUMMARY OF THE INVENTION

The present invention has been attained to solve the aforementioned problem and an object thereof is to provide an inexpensive submergence measures apparatus in which a pane of window glass on a driver's seat side can be opened surely when a vehicle is submerged.

According to the present invention, the apparatus for taking measures against submergence of a vehicle includes a submergence backup circuit formed on a substrate carrying electronic circuits in the vehicle, wherein the submergence backup circuit includes a submergence detection means for detecting a submergence state and the submergence backup circuit is configured to perform drive control of a window so as to control the window to be able to move only in an opening direction when the vehicle is submerged.

Preferably, the submergence backup circuit is configured to perform drive control of the window so as to drive the window to open when a manual window operating switch is operated into an opening side but so as not to drive the window when the manual window operating switch is operated into a closing side.

More preferably, the submergence backup circuit is set up on a driver's seat side.

Further preferably, waterproof coating is applied to at least constituent members of the submergence backup circuit.

Although the aforementioned configuration is simple and inexpensive, the power window mechanism can be operated not in an ascending direction but only in a descending direction by the manual operation of the operating switch when the vehicle is submerged. Hence, in the aforementioned configuration, a pane of window glass on a driver's seat side can be opened surely only by the operation of the switch.

Description of Preferred Embodiment

An embodiment of the present invention will be described below with reference to the drawings.

Figure 1:
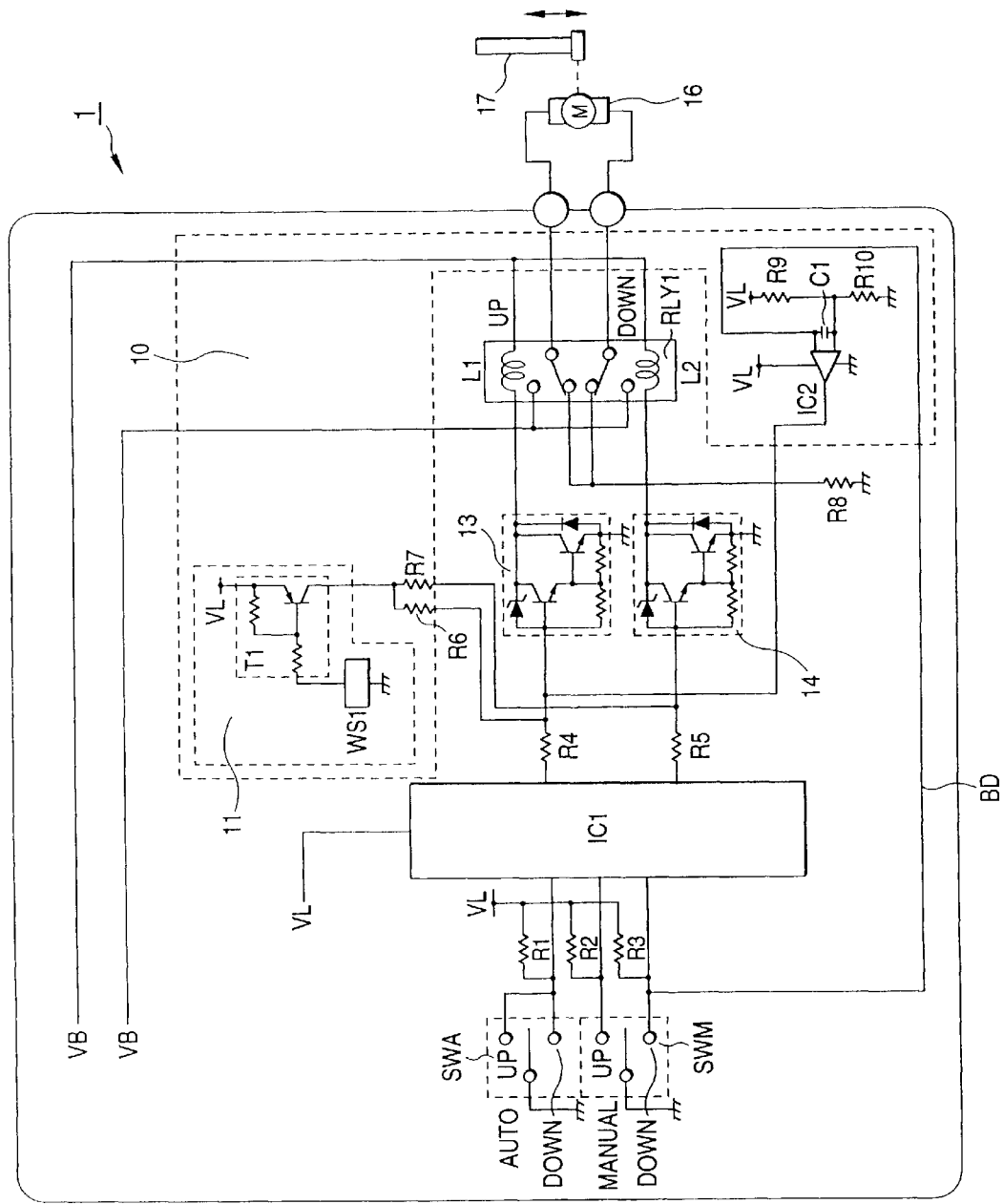
FIG. 1 is a circuit diagram showing the configuration of a power window control portion of a vehicle including a submergence measures apparatus according to an embodiment of the present invention.

FIG. 1 is a circuit diagram showing the configuration of a submergence measures apparatus according to an embodiment of the present invention.

Figure 2:
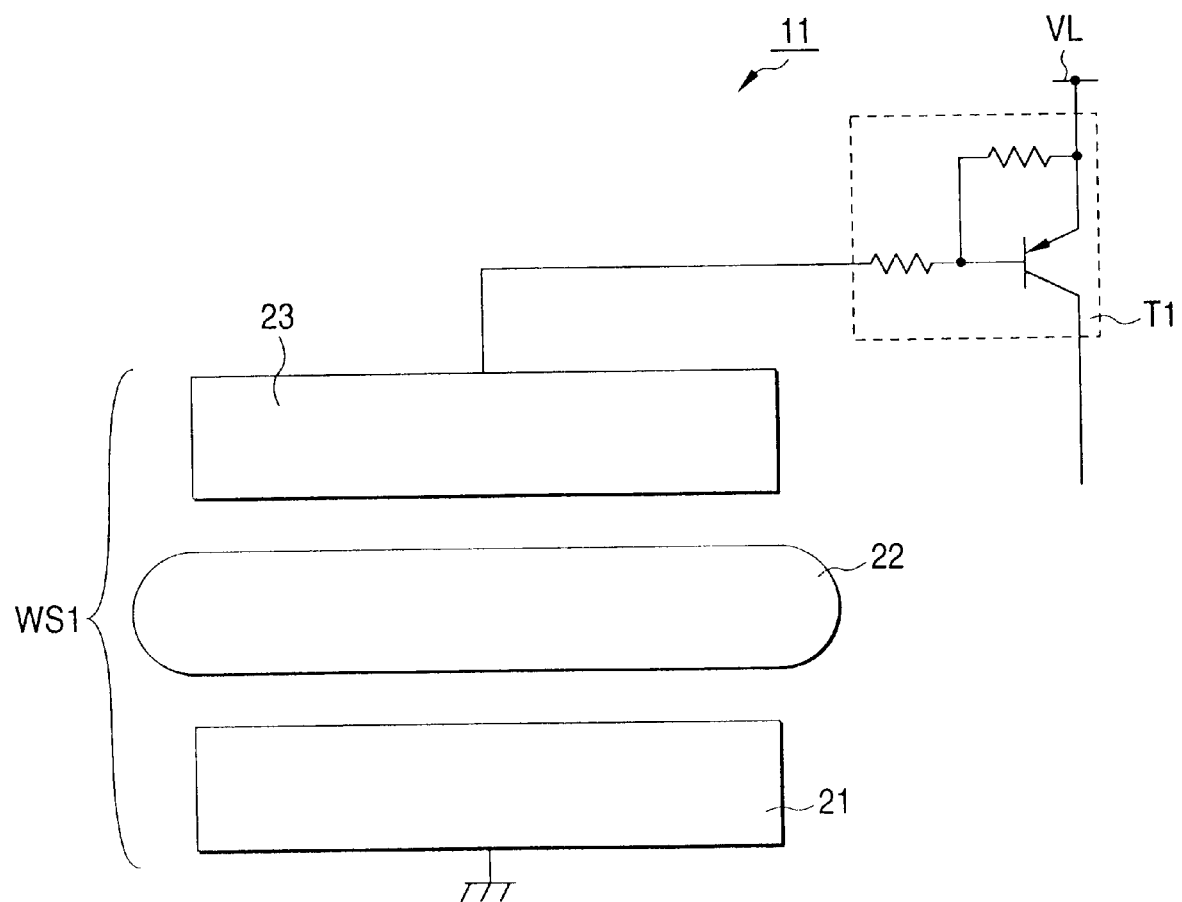
FIG. 2 is a circuit diagram showing an example of the configuration of a submergence detection portion of the submergence measures apparatus according to the embodiment of the present invention.

FIG. 2 is a circuit diagram showing an example of configuration of a submergence detection portion of the submergence measures apparatus according to the embodiment of the present invention.

In the embodiment of the present invention, a submergence measures apparatus 1 has a submergence backup circuit 10 which operates to open a window on a driver's seat side surely when a vehicle is submerged. The apparatus 1 has an UP-side switching circuit 13, a DOWN-side switching circuit 14, a changeover relay RLY1, an automatic window operating switch SWA, a manual window operating switch SWM, an ordinary-state control circuit IC1, and other circuit elements.

The submergence backup circuit 10 has a submergence detection portion 11 equivalent to a submergence detection means for detecting a submergence state, a submergence-state control circuit IC2, a capacitor C1, and resistors R6, R7, R9 and R10.

The submergence detection portion 11 includes a submergence detection means WS1 for detecting a submergence state, and a detection signal output circuit T1 for outputting a submergence detection signal when the submergence state is detected. For example, the submergence detection means WS1 can use a structure as shown in FIG. 2.

Two solder pads are electrically connected to each other via a long hole 22 when the vehicle is submerged. A first solder pad 21 is connected to the ground. A second solder pad 23 is connected to the detection signal output-circuit T1. The detection signal output circuit T1 has a transistor, and resistors. The transistor has a base connected to the second solder pad 23 of the submergence detection means WS1, an emitter supplied with a control system source voltage VL, and a collector connected to the resistors R6 and R7 and further connected to control input terminals of the UP-side and DOWN-side switching circuits 13 and 14 through the resistors R6 and R7 respectively.

The automatic and manual window operating switches SWA and SWM are configured to be connected to the ordinary-state control circuit IC1. Two output terminals of the ordinary-state control circuit IC1 are connected to the UP-side and DOWN-side switching circuits 13 and 14 through resistors R4 and R5 respectively.

The submergence-state control circuit IC2 has two input terminals. One input terminal is connected to the DOWN side of the manual window operating switch SWM. The other input terminal is supplied with a predetermined voltage obtained by division of the control system source voltage VL between the resistors R9 and R10. The capacitor C1 is inserted in between the two input terminals. The submergence-state control circuit IC2 further has an output terminal connected to a control input terminal of the UP-side switching circuit 13. When a DOWN operation of the manual window operating switch SWM is detected, the submergence-state control circuit IC2 controls the UP-side switching circuit 13.

One end of the UP-side switching circuit 13 and one end of the DOWN-side switching circuit 14 are connected to the ground. The other end of the UP-side switching circuit 13 and the other end of the DOWN-side switching circuit 14 are connected to coils L1 and L2, respectively, of the changeover relay RLY1. Also in the changeover relay RLY1, one end of each of relay switches is connected to the power window drive motor 16. The other end of each of the relay switches in the changeover relay RLY1 is supplied with a battery source voltage VB. The changeover relay RLY1 is configured so that the battery source voltage VB is supplied to the drive motor 16 through the changeover relay RLY1 to rotate the drive motor 16 to thereby move up/down a pane of window glass 17 to open/close the window.

The operation of the submergence measures apparatus configured as described above will be described below.

When the vehicle is submerged, water such as fresh water or salt water invades the vehicle so that the submergence detection means WS1 is immersed in water. Hence, the long hole 22 of the submergence detection means WS1 is filled with the invading water, so that a leakage current flows between the solder pads 21 and 23 to bring a current-conduction state. As a result, the base potential of the transistor of the detection signal output circuit T1 gets a low level-near to the ground level, so that the transistor is turned on. Hence, the ON-state current of the transistor of the detection signal output circuit T1 is sent as a submergence detection signal to the UP-side and DOWN-side switching circuits 13 and 14.

As a result, each of the UP-side and DOWN-side switching circuits 13 and 14 get an ON state, so that a current flows in each of the UP-side and DOWN-side coils L1 and L2 of the changeover relay RLY1. Hence, the two relay switches are connected to the battery source voltage VB side (ON state). In this state, if the manual window operating switch SWM is connected to the DOWN side by a crew member, BD gets a low level. Upon reception of a low-level input, the submergence-state control circuit IC2 controls the UP-side switching circuit 13 to turn off.

As a result, any current does not flow in the UP-side coil L1 of the changeover relay RLY1 and the UP-side relay switch is connected to the ground (OFF state). Because only the DOWN-side relay switch is in an ON state, a drive current flows in the drive motor 16 so that the drive motor 16 rotates downward (DOWN) to move down the pane of window glass 17 to open the window.

On the other hand, in a state in which the manual window operating switch SWM is connected to the UP side or connected to neither of the UP and DOWN sides, BD gets a high level. Upon reception of a high-level input, the submergence-state control circuit IC2 in the submergence backup circuit 10 controls the UP-side switching circuit 13 to turn on. Hence, a current flows in the UP-side coil L1 of the changeover relay RLY1, so that the UP-side relay switch gets in an ON state. As a result, any drive current does not flow in the drive motor 16, so that the drive motor 16 gets in a rotation stop state. Hence, even if a crew member carries out an UP operation, the window is never closed because the power window mechanism does not operate.

When the vehicle is submerged, the automatic window operating switch SWA has no relation with the operation, whether the automatic window operating switch SWA is connected to the UP side or to the DOWN side. That is, when the vehicle is submerged, the ordinary-state control circuit IC1 has no relation with the operation. Accordingly, even if the ordinary-state control circuit IC1 becomes inoperative when the vehicle is submerged, the pane of window glass 17 can be moved down surely by the DOWN operation of the manual window operating switch SWM.

Incidentally, waterproof coating is preferably applied to specific members of the aforementioned submergence counter apparatus, that is, circuit constituent members such as the submergence backup circuit 10, the UP-side switching circuit 13, the DOWN-side switching circuit 14, the changeover relay RLY1, etc. which need to operate when the vehicle is submerged.

According to the present invention, there can be provided a vehicle submergence measures apparatus comprising a submergence backup circuit formed on a substrate carrying electronic circuits in a vehicle, wherein the submergence backup circuit includes a submergence detection means for detecting a submergence state and wherein the submergence backup circuit is configured to perform drive control of a window so as to control the window to be able to move only in an opening direction when the vehicle is submerged. More specifically, the submergence backup circuit is configured to perform drive control of the window so as to drive the window to open when a manual window operating switch is operated into an opening side but the window is not driven when the manual window operating switch is operated into a closing side. Moreover, the submergence backup circuit is set up on a driver's seat side. Hence, a pane of window glass on the driver's seat side can be opened more surely though the apparatus is simple and inexpensive. Hence, the vehicle submergence measures apparatus can be provided so that a crew member can escape out of the vehicle easily.

Moreover, waterproof coating is applied to at least constituent members of the backup circuit. Hence, when the vehicle is submerged, the submergence backup circuit can be operated more surely to perform drive control of the pane of window glass.

What is claimed is:

1. A submergence measures apparatus against submergence of a vehicle having a substrate on which an electric circuit controlling at least one window of the vehicle is mounted, said submergence measures apparatus comprising:

a submergence backup circuit provided at said substrate, said submergence backup circuit including a submergence detection member for detecting said submergence, wherein said submergence backup circuit controls said window to be driven in an opening direction only when a manual window operating switch is actuated to an opening position when said submergence detection member detects said submergence, and prohibits said window from being driven when said manual window operating switch is actuated to a closing position when said submergence detection member detects said submergence.

2. A submergence measures apparatus according to claim 1, wherein said submergence backup circuit is arranged on a driver's seat side.

3. A submergence measures apparatus according to claim 1, wherein waterproof coating is applied to said submergence backup circuit.

4. A method of controlling at least one window of a vehicle in case of the vehicle submerged, said window operated by actuation of a manual window operating switch, said method comprising the steps of:

detecting when said vehicle is submerged into water, and generating a submerged signal when said vehicle is detected to be submerged; and in response to said submerged signal, controlling said window to be driven in said opening direction only when said manual window operating switch is actuated to an opening position and prohibiting said window from being driven when said manual window operating switch is actuated to a closing position.

* * * * *